(12) United States Patent
Timlick

(10) Patent No.: US 6,520,491 B2
(45) Date of Patent: Feb. 18, 2003

(54) IMPACT ATTENUATION

(76) Inventor: Brian C. Timlick, 14 Loyola Bay, Winnipeg, Manitoba (CA), R3T 3J6

( * ) Notice: Subject to any disclaimer, the term of this patent is extended or adjusted under 35 U.S.C. 154(b) by 0 days.

(21) Appl. No.: 09/833,698

(22) Filed: Apr. 13, 2001

(65) Prior Publication Data

US 2001/0011789 A1 Aug. 9, 2001

Related U.S. Application Data

(63) Continuation of application No. 09/272,448, filed on Mar. 19, 1999, now abandoned
(60) Provisional application No. 60/078,705, filed on Mar. 20, 1998.

(51) Int. Cl.[7] .............................................. A47C 27/08
(52) U.S. Cl. ........................ 267/113; 267/35; 267/80; 267/116; 267/139
(58) Field of Search ................................. 267/113, 142, 267/35, 143, 116, 117, 145, 64.11, 80, 152, 153, 139, 140; 280/751; 2/455, 465, 24, 267, 459, 463, 464; 5/706, 707, 712, 710, 711, 420, 654, 655.3, 502, 486; 248/631, 634, 633; 428/172; 188/268, 378

(56) References Cited

U.S. PATENT DOCUMENTS 5,543,194 A * 8/1996 Rudy

* cited by examiner

Primary Examiner—Douglas C. Butler
(74) Attorney, Agent, or Firm—Aikins, MacAulay & Thorvaldso.; Murray E. Thrift

(57) ABSTRACT

An apparatus for attenuating shock loads includes a flexible, non-rigid outer impervious envelope. The envelope is formed from a high strain resistance material. An inner, pervious baffle extends across the envelope between the first and second sides. The inner baffle is also a flexible, non-rigid material of high strain resistance. The envelope is inflated with gas at a superatmospheric pressure. An impact on one side of the structure will compress that side, increasing the pressure of the gas between that side and the baffle. The gas will then flow through the pervious baffle to the other side, dissipating energy, spreading the load over the second side of the envelope and causing a time delay in the build-up of pressure on the second side. In preferred embodiments of the invention, there are plural, parallel baffles in the envelope to provide a multi-stage energy dissipation. The preferred material of the outer envelope and the baffle is a high tensile strength woven fabric, with the envelope having an impervious inner coating.

20 Claims, 3 Drawing Sheets

IMPACT ATTENUATION

CROSS REFERENCE TO RELATED APPLICATIONS

This application is a continuation of application Ser. No. 09/272,448, filed Mar. 19, 1999, now abandoned, which claims benefit of provisional application No. 60/078,705 filed Mar. 20, 1998.

FIELD OF THE INVENTION

The present invention relates to impact attenuation.

BACKGROUND

Impact attenuation devices according to the invention may be incorporated in many different products for absorbing shock loads from impacts. In automobiles, devices according to the invention may be incorporated into doors to absorb side impacts and into the front and rear ends to absorb energies involved in front and rear end crashes. In sports equipment, the invention may be used, for example, in sporting helmets.

SUMMARY

According to the present invention there is provided an apparatus for attenuating shock loads, comprising:

a flexible, non-rigid, outer envelope with opposite, spaced apart first and second sides and a peripheral wall extending between the first and second sides;

an inner baffle extending across the envelope, the baffle being positioned between and spaced from the first and second sides and having a periphery secured to the peripheral wall of the envelope so as to separate the interior of the envelope into chambers on opposite sides of the inner baffle, the inner baffle comprising a flexible, non-rigid material of high strain resistance; and gas inflating said envelope to a superatmospheric pressure wherein:

the outer envelope is formed from a material of high strain resistance that is impervious to said gas; and the inner baffle is formed from a flexible, non-rigid material of high strain resistance that is pervious to said gas, whereby:

a shock load on one of said first and second sides will produce an increased gas pressure between the baffle and said one of said first and second sides above said superatmospheric pressure and gas will permeate through the baffle to reduce the increased gas pressure.

The gas flow through the pervious baffle dissipates energy, spreading the load over the second side of the envelope and causing a time delay in the build-up of pressure on the second side. In preferred embodiments of the invention, there are plural, parallel baffles in the envelope to provide a multi-stage energy dissipation.

The outer envelope is preferably made from a high tensile strength woven fabric with an impervious inner coating. Exemplary materials are a fabric woven from para-amide fibres such as those sold under the trademark "KEVLAR". The impervious coating may be a polyurethane coating, with additional sealing material used as necessary, for example to seal seams. The baffle may be made of a fabric woven from the same material, but uncoated to provide the desired permeability. The pattern and tightness of the weave will alter the permeability properties and thus the rate at which gas will pass through the baffle. These characteristics may used to vary the shock attenuation properties of the apparatus.

The gas used in the envelope is preferably nitrogen. For manufacture, liquid nitrogen can be poured into the envelope. When the envelope is sealed closed, the nitrogen is allowed to evaporate, inflating the envelope. This avoids the use of high pressure injection valves.

The maximum impact that can be absorbed by a device according to the invention is a function of the internal pressure at which the envelope will rupture. The ultimate rupture strength can be increased by adding fabric jackets to the outside of the envelope. These fit over the envelope like a pillow case. The jackets are preferably made of the same high strength textile fabric as the envelope.

Because the device is made from cloth, it can be made in almost any desired shape. For contoured shapes, ties may be used between the opposite sides, varying the maximum spacing between the sides.

The apparatus may also be rechargeable. It can be refilled with gas to compensate for leakage over time. This is particularly easy if the gas is introduced as a liquid.

As noted above, the apparatus may not use a pressure valve. Instead, a neck may be formed on the outer envelope. This can be used as a port providing access to the interior of the envelope for sealing the final seam of the envelope during manufacture. It is also used as a port into which liquid nitrogen is poured. When the liquid is in the envelope, knots are tied in the neck to close off the egress for gas as the liquid vaporizes.

BRIEF DESCRIPTION OF THE DRAWINGS

In the accompanying drawings, which illustrate an exemplary embodiment of the present invention.

DETAILED DESCRIPTION

Figure 1:
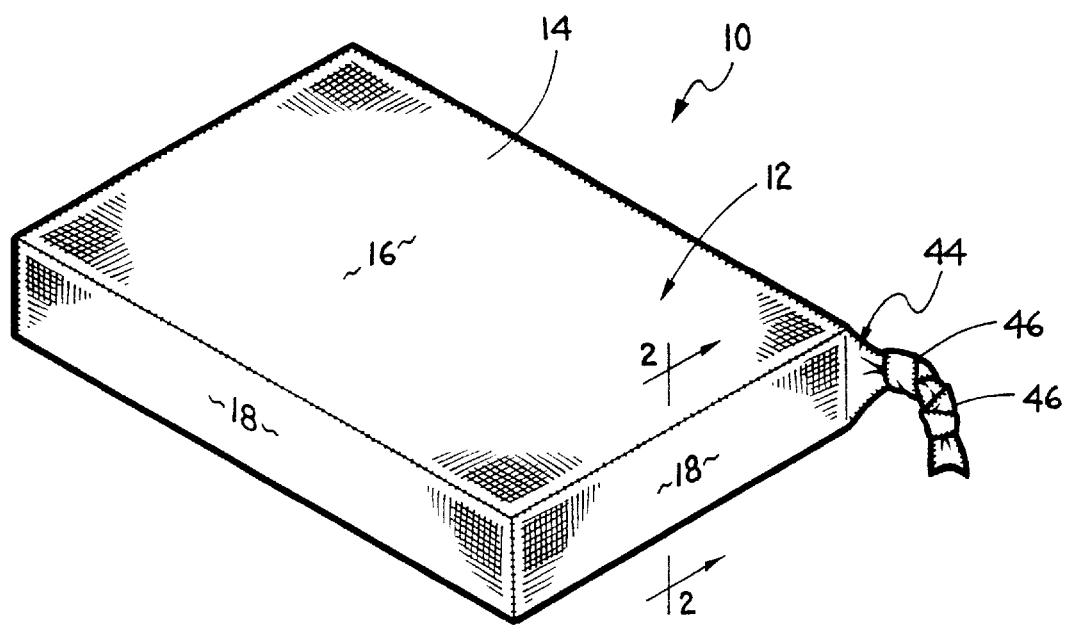
FIG. 1 is an isometric view of an attenuation device according to the present invention.
Figure 2:
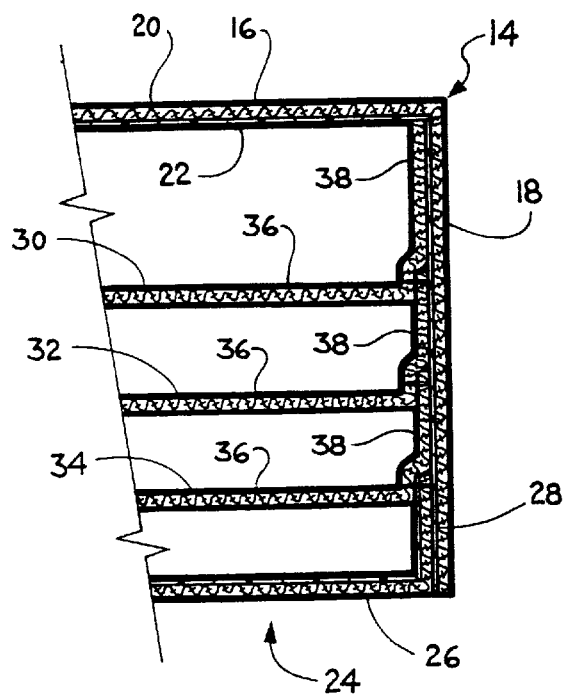
FIG. 2 is a cross-section along line 2—2 of FIG. 1.
Figure 3:
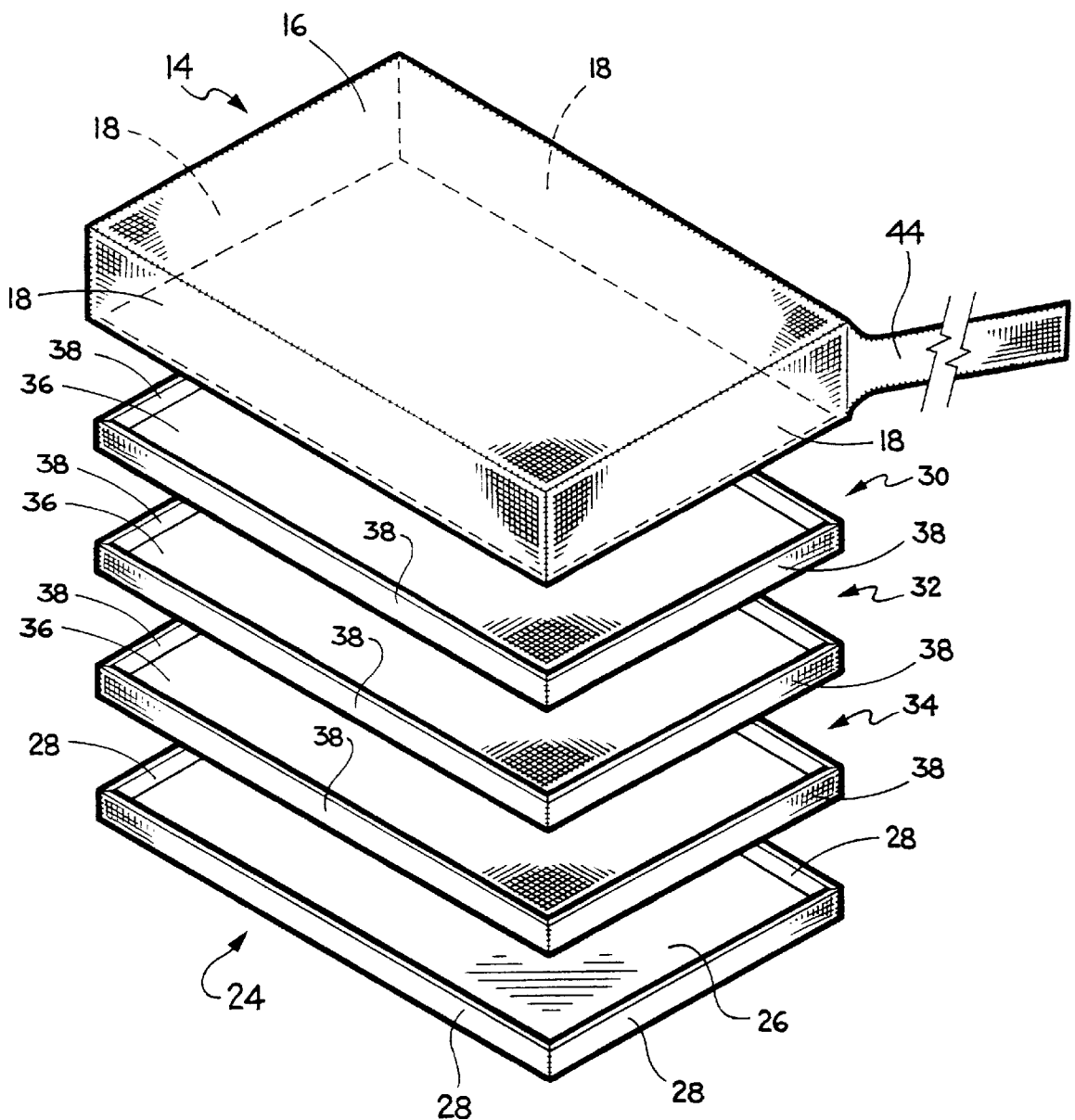
FIG. 3 is an exploded view of the device of FIG. 1.

Referring to the accompanying drawings, there is illustrated an attenuation apparatus 10. It has an outer envelope 12 formed as a rectangular block. As illustrated most particularly in FIG. 2, the apparatus is formed with a top element 14 having a rectangular top panel 16 that constitutes a top or first side of the apparatus. The top element also includes four side panels 18. The panels 16 and 18 are a woven cloth of a para-amide fibre 20 with a polyurethane, impervious coating 22 (FIG. 2). The corners of the top element are stitched together and sealed using a silicon sealant (not shown).

The apparatus includes a bottom element 24 similar to the top element. It includes a rectangular bottom panel 26 that is the bottom or second side of the apparatus and four side panels 28. Like the top element, these panels 26 and 28 are para-amide fibre woven cloth with an internal coating of polyurethane. The bottom element is sized to fit snugly into the top element 16.

Three baffles, 30, 32 and 34 fit into the top element 14 between the top panel 16 and the bottom element 24. Each baffle has a rectangular main panel 36 and four side panels 38. These baffles are formed from woven para-amide cloth. In this case, they are uncoated so that gas may permeate through them. To assemble the apparatus, the baffles are assembled in sequence onto the bottom element, with the main panel of each baffle set into the top of the bottom element or the top of the preceding baffle and stitched in place using a peripheral line of stitching. The stitching is sealed using a silicon sealant. When the baffles and bottom have been assembled, the assembly is inserted into the top element and the top element and bottom element are secured together.

To assist in the final sealing operation, and to fill the apparatus with pressurized gas, the top element is equipped with a neck 44 of the same coated textile fabric as the top element. This neck provides access to the interior of the apparatus for a final sealing operation as well as providing access for the introduction of liquid nitrogen.

When the liquid nitrogen has been poured into the apparatus, knots 46 are formed in the neck 44 to close it against leakage.

Figure 4:
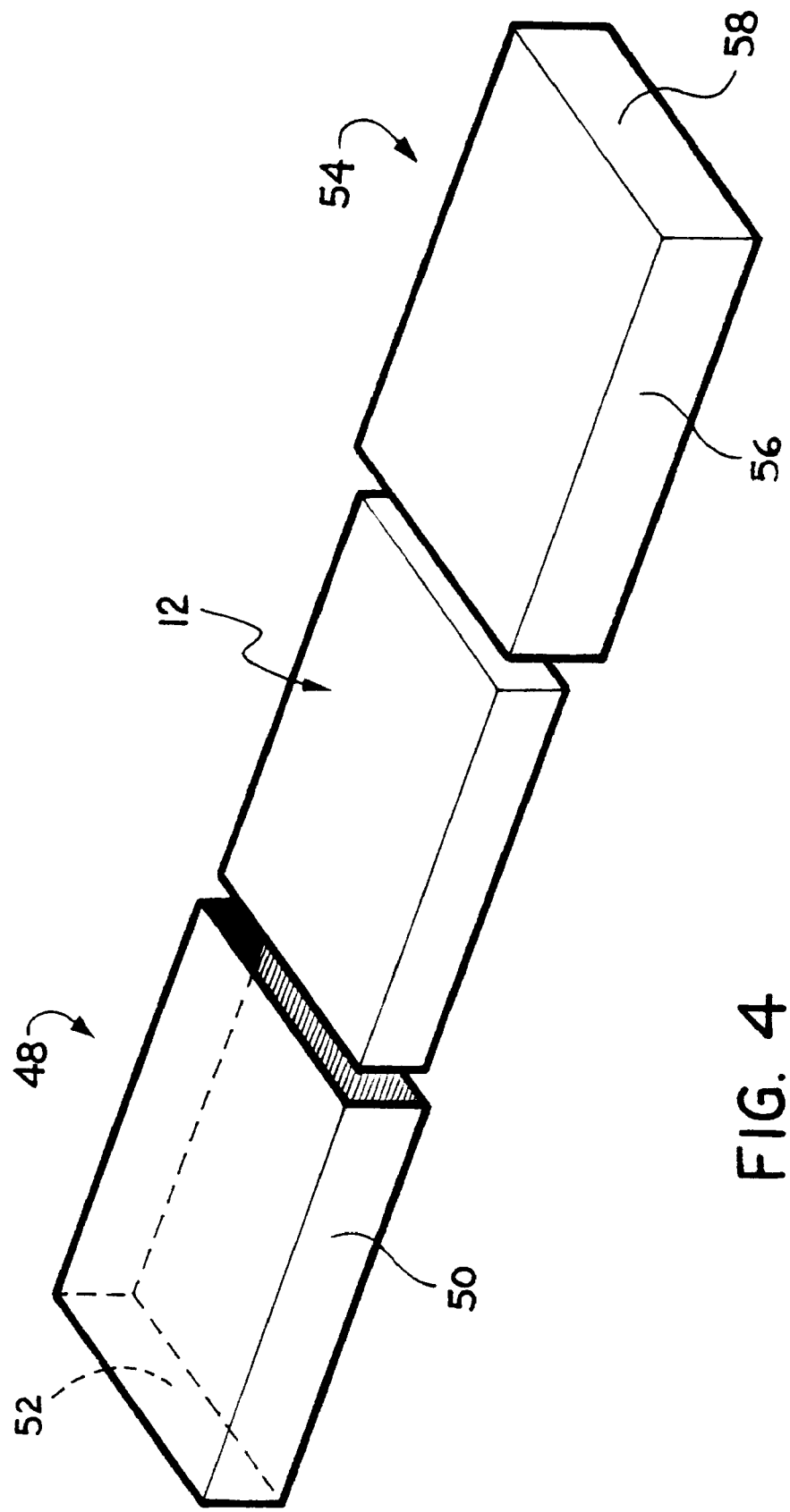
FIG. 4 is an exploded view of a jacket arrangement for the attenuation device.

In use of the apparatus, impact on one side of the apparatus will increase the gaseous pressure in the chamber between that side and the adjacent baffle. This pressurized gas then permeates through the baffle to increase the pressure in the chamber on the opposite side of the baffle, thus dissipating energy from the pressurized gas and introducing a time delay the transmission of gas pressure through the baffle.

Where it is desired to increase the ultimate capacity of the apparatus, additional jackets may be fitted on the outside of the envelope 12. Jackets for this purpose are illustrated in FIG. 4, where a jacket 48 has a sleeve 50 and a closed end 52 in an open-ended structure that slides over the apparatus much in the nature of a pillow case. Another jacket 54 has a sleeve 56 and a closed end 58 that slide over the apparatus from the opposite side, so that both ends are closed while providing a double layer of additional reinforcement on both top and bottom sides of the envelope. The jackets are formed of the same para-amide fibre cloth as the remainder of the device.

While one embodiment of the present invention has been described in the foregoing, it is to be understood that many other embodiments are possible within the scope of the invention and are intended to be included herein. Many different shapes, sizes and capacities of the apparatus for many different purposes are possible.

What is claimed is:

1. An apparatus for attenuating shock loads, comprising:
   a flexible, non-rigid, outer envelope with opposite, spaced apart first and second sides and a peripheral wall extending between the first and second sides;
   an inner baffle extending across the envelope, the baffle being positioned between and spaced from the first and second sides and having a periphery secured to the peripheral wall of the envelope so as to separate the interior of the envelope into chambers on opposite sides of the inner baffle, the inner baffle comprising a flexible, non-rigid material of high strain resistance; and
   gas inflating said envelope to a superatmospheric pressure wherein:
   the outer envelope is formed from a material of high strain resistance that is impervious to said gas; and
   the inner baffle is formed from a flexible, non-rigid material of high strain resistance that is pervious to said gas, whereby:
      a shock load on one of said first and second sides will produce an increased gas pressure between the baffle and said one of said first and second sides above said superatmospheric pressure and gas will permeate through the baffle to reduce the increased gas pressure.

2. An apparatus according to claim 1 including plural, parallel inner baffles in the envelope separating the envelope into plural chambers respectively between the first and second sides and adjacent ones of the inner baffles and between adjacent ones of the inner baffles.

3. An apparatus according to claim 1 wherein the outer envelope comprises a high tensile strength woven fabric with an impervious inner coating.

4. An apparatus according to claim 3 wherein the outer envelope comprises para-amide fibres.

5. An apparatus according to claim 3 wherein the impervious coating comprises polyurethane.

6. An apparatus according to claim 3 wherein the inner baffle comprises a high tensile strength woven fabric.

7. An apparatus according to claim 1 wherein the gas is nitrogen.

8. An apparatus according to claim 1 including at least one fabric jacket on the outside of the envelope.

9. An apparatus according to claim 8 wherein each jacket comprises a high tensile strength woven fabric.

10. An apparatus according to claim 1 including a neck formed on the outer envelope.

11. An apparatus for attenuating shock loads, comprising:
    a flexible, non-rigid, impervious first element with a first side panel and a first peripheral wall extending peripherally around the first side panel and projecting from an inner side of the first side panel, the first element being formed from a material with high strain resistance;
    a flexible, non-rigid, impervious second element with a second side panel and a second peripheral wall extending peripherally around the second side panel and projecting from an inner side of the first side panel, the second peripheral wall extending into and secured to the peripheral wall of the first element with the first and second side panels spaced apart, the second element being formed from a material with high strain resistance;
    at least one pervious inner baffle between and spaced from the first and second side panels and having a periphery secured to one of the first and second peripheral walls so as to separate the interior of the envelope into chambers on opposite sides of the inner baffle, the inner baffle comprising a flexible, non-rigid material of high strain resistance; and
    gas inflating said envelope to a superatmospheric pressure.

12. An apparatus according to claim 11 including plural, parallel, pervious inner baffles spaced apart between the first and second side panels, each baffle having a periphery secured to one of the first and second peripheral walls and comprising a flexible, non-rigid material of high strain resistance.

13. An apparatus according to claim 11 wherein each of the first and second elements comprises a high tensile strength woven fabric with an impervious inner coating.

14. An apparatus according to claim 13 wherein each of the first and second elements comprises para-amide fibres.

15. An apparatus according to claim 13 wherein the impervious coating comprises polyurethane.

16. An apparatus according to claim 13 wherein the inner baffle comprises a high tensile strength woven fabric.

17. An apparatus according to claim 11 wherein the gas is nitrogen.

18. An apparatus according to claim 11 including at least one fabric jacket surrounding the first and second elements.

19. An apparatus according to claim 18 wherein each jacket comprises a high tensile strength woven fabric.

20. An apparatus according to claim 11 including a neck formed on the first element.

* * * * *